(12) United States Patent
Plain

(10) Patent No.: US 12,543,723 B2
(45) Date of Patent: Feb. 10, 2026

(54) RODENT KILLING APPARATUS

(71) Applicant: John Plain, Park Ridge, NJ (US)

(72) Inventor: John Plain, Park Ridge, NJ (US)

(73) Assignee: John Plain, Park Ridge, NJ (US)

( * ) Notice: Subject to any disclaimer, the term of this patent is extended or adjusted under 35 U.S.C. 154(b) by 0 days.

(21) Appl. No.: 18/973,773

(22) Filed: Dec. 9, 2024

(65) Prior Publication Data

US 2025/0194580 A1    Jun. 19, 2025

Related U.S. Application Data

(60) Provisional application No. 63/611,957, filed on Dec. 19, 2023.

(51) Int. Cl.
*A01M 23/38* (2006.01)

(52) U.S. Cl.
CPC .................................. *A01M 23/38* (2013.01)

(58) Field of Classification Search
CPC ..................................................... A01M 23/28
See application file for complete search history.

(56) References Cited

U.S. PATENT DOCUMENTS

| | | | | |
|---|---|---|---|---|
| 5,953,853 | A * | 9/1999 | Kim ...................... | A01M 23/02 43/98 |
| 10,893,671 | B1 * | 1/2021 | Nelson .................. | A01M 23/38 |
| 11,470,835 | B1 * | 10/2022 | Shoemaker ........... | A01M 23/08 |
| 2018/0325092 | A1 * | 11/2018 | Round .................. | A01M 23/12 |
| 2018/0352801 | A1 * | 12/2018 | Veber .................... | A01M 23/08 |

* cited by examiner

*Primary Examiner* — Joshua J Michener
*Assistant Examiner* — Henry Hooper Mudd
(74) *Attorney, Agent, or Firm* — Meagher Emanuel Laks Goldberg & Liao LLP

(57) ABSTRACT

A rodent control apparatus comprising an elongated tube sized to receive a rodent (e.g., rat, mouse, etc.) at a front portion, electrocute the rodent in a middle portion, and propel the rodent's body toward a rodent disposal bag attached to a rear portion. The apparatus is configured to kill and store the remains of many rodents and, as such, finds great utility within the context of reducing a local rodent population.

20 Claims, 3 Drawing Sheets

RODENT KILLING APPARATUS

CROSS-REFERENCE TO RELATED APPLICATION

This application claims the benefit of provisional patent application Ser. No. 63/611,957 filed on Dec. 19, 2023, which provisional patent application is incorporated herein by reference in its entirety.

FIELD OF THE DISCLOSURE

The present disclosure generally relates to rodent killing apparatus.

BACKGROUND

Rats, mice, and other rodents have plagued human settlements ever since people first started living together in towns and cities both large and small. Rats have lurked in alleyways and dark places and have rummaged through garbage in broad daylight and have all too frequently invaded dwellings and people's living spaces causing great discomfort to people and much worse, spreading diseases such as the great plague which decimated human populations in Europe during the Middle Ages. Indeed, rats have oftentimes made their way onto ships where they have "stowed away" in the ships' holds, thus making their way from continent to continent, and of course, they are pretty much ubiquitous throughout the world.

Even with all of our modern technological abilities the human race still suffers from rats and rat infestations on city streets and in alleyways and in buildings, and the problem is most apparent in poorer neighborhoods.

Traditional methods of attempting to control rat populations and to keep them from becoming rate infestations use chemical poisons which can leave toxic residues that can be harmful to people and their pets; poisons and rat traps have not proven to be fully effective in dealing with rat populations.

Improvements are desired.

SUMMARY OF THE INVENTION

Various deficiencies in the prior art are addressed below by a rodent control device or apparatus comprising an elongated tube sized to receive a rodent (e.g., rat, mouse, etc.) at a front portion, electrocute the rodent in a middle portion, and propel the rodent's body toward a rodent disposal bag attached to a rear portion. The apparatus is configured to kill and store the remains of many rodents and, as such, finds great utility within the context of reducing a local rodent population. The rodent control device may include front and rear stands configured to hold the apparatus at an angle such that a rodent entering via the front portion is urged to traverse a killing portion (high voltage wires, electrodes, and the like) toward the rodent disposal bag at the rear portion. This angle is also useful for cleaning, when water and/or cleaning solution may be introduced at a cleaning port at an upper front portion of the apparatus so as to run through the apparatus and help remove rodent remains, droppings, and the like. The rodent may also be urged via mechanical means through the apparatus, such as via a powered conveyor belt or other device.

A rodent killing apparatus according to an embodiment comprises an elongated tube having a front end aperture sized to receive a rodent and a rear end configured to attachably receive a rodent disposal bag; a power conversion and control circuit for generating at least one alternating current (AC) electrical signal in response to a trigger signal indicative of the presence of a rodent within the elongated tube; at least one step-up transformer for converting an AC electrical signal into a high voltage AC electrical signal; at least one conductor for exposing a high voltage AC electrical signal to a rodent within the elongated tube; and a rodent motivation mechanism configured to move a rodent toward the distal end of the elongated tube.

The rodent motivation mechanism may comprise a moving belt disposed between front and rear belt rollers attached to respective front and rear lower surfaces of the elongated tube, at least one of the front and rear belt rollers being rotated via a motor electrically coupled to the power conversion and control circuit.

The elongated housing contains therein the elongated tube and has attached to an outside surface an elongated housing containing therein power conversion and control circuit and a battery. The elongated tube may comprise an inner elongated tube, and the elongated housing comprises an outer elongated tube, the outer elongated tube having a diameter greater than that of the inner elongated tube.

The electrical conductor(s) may comprise one or more wires passing through an inner portion of the elongated tube, one or more electrodes disposed within a slot formed within an inner surface of the elongated tube and axially extending along a portion of the elongated tube, or other means of contacting a rodent with an energized conductor.

The electrical conductor may comprise a plurality of electrodes disposed within corresponding slots formed within the inner surface of the elongated tube and axially extending along respective portions of the elongated tube.

The electrical conductor may comprise a plurality of electrodes disposed within corresponding slots formed within the inner surface of the elongated tube and axially extending along respective portions of the elongated tube.

The rodent killing apparatus may further comprise a front stand secured to a lower front portion of the elongated housing and a rear stand secured to a lower rear portion of the elongated housing, the front stand having a height greater than a height of the rear stand; and a cleaning port having a wider portion passing through an aperture at an upper front portion of the elongated housing, and a narrow portion passing through an aperture at an upper front portion of the elongated tube.

The elongated housing may comprise an opaque material and the elongated tube comprises a translucent material, the apparatus may further comprise an observation aperture formed within an upper portion of the elongated housing, the observation aperture having fitted thereto a removable observation door.

The apparatus and its components may be adapted in size for any rodent, such as rats or mice.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
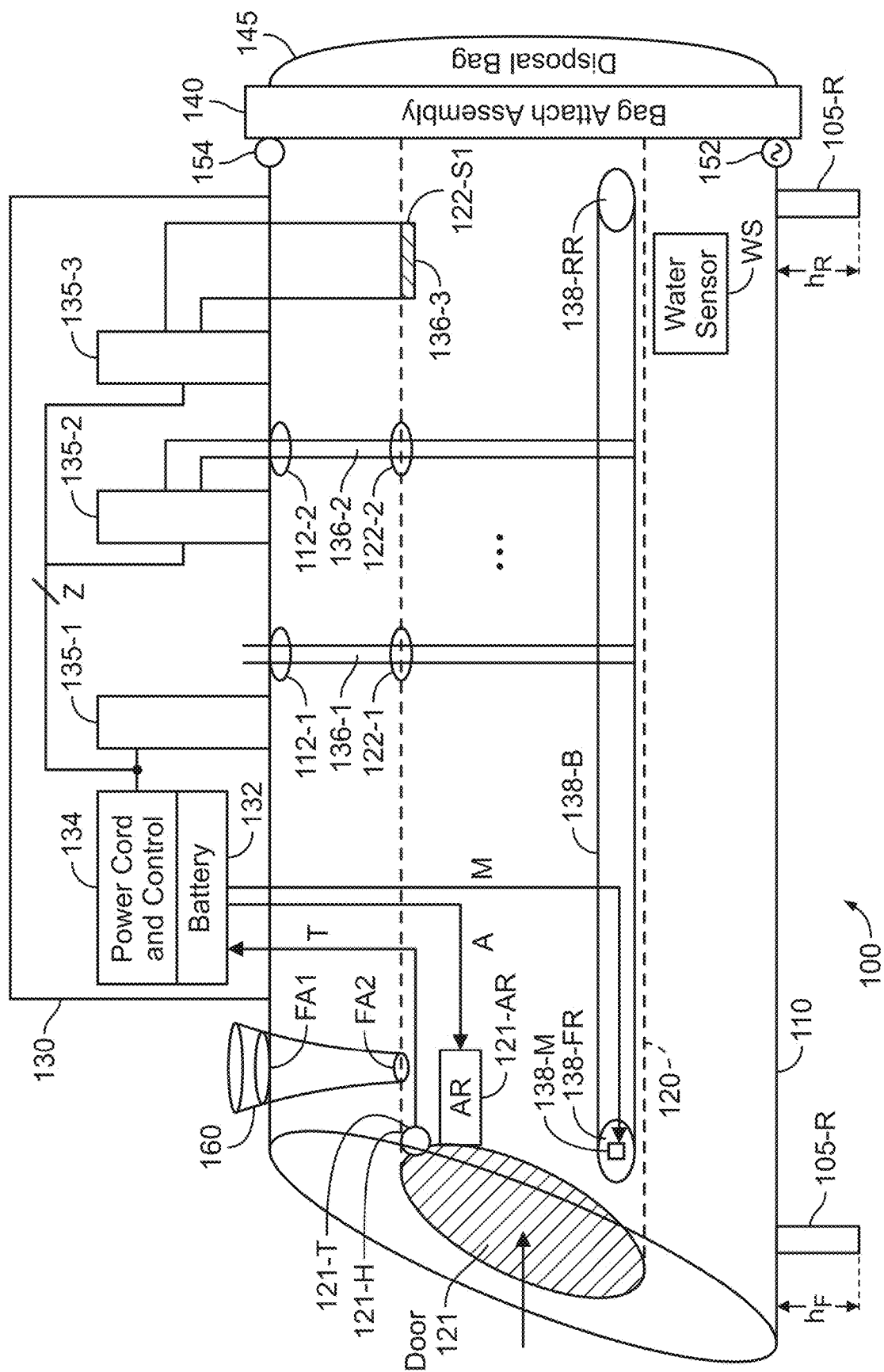
FIG. 1 depicts a perspective diagram of a rodent killing apparatus according to several embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art and are to be construed as being without limitation to such specifically recited examples and conditions. Additionally, the term, "or" as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various deficiencies in the prior art are addressed below by a rodent control device or apparatus comprising an elongated tube sized to receive a rodent (e.g., rat, mouse, etc.) at a front portion, electrocute the rodent in a middle portion, and propel the rodent's body toward a rodent disposal bag attached to a rear portion. The apparatus is configured to kill and store the remains of many rodents and, as such, finds great utility within the context of reducing a local rodent population. The rodent control device may include front and rear stands configured to hold the apparatus at an angle such that a rodent entering via the front portion is urged to traverse a killing portion (high voltage wires, electrodes, and the like) toward the rodent disposal bag at the rear portion. This angle is also useful for cleaning, when water and/or cleaning solution may be introduced at a cleaning port at an upper front portion of the apparatus so as to run through the apparatus and help remove rodent remains, droppings, and the like. The cleaning port may comprise a funnel structure or may be configured to receive a detachable funnel structure such as for the insertion of cleaning solution, water, and the like into the apparatus. The rodent may also be urged via mechanical means through the apparatus, such as via a powered conveyor belt or other device.

A rodent killing apparatus according to an embodiment comprises an elongated tube having a front end aperture sized to receive a rodent and a rear end configured to attachably receive a rodent disposal bag; a power conversion and control circuit for generating at least one alternating current (AC) electrical signal in response to a trigger signal indicative of the presence of a rodent within the elongated tube; at least one step-up transformer for converting an AC electrical signal into a high voltage AC electrical signal; at least one conductor for exposing a high voltage AC electrical signal to a rodent within the elongated tube; and a rodent motivation mechanism configured to move a rodent toward the distal end of the elongated tube.

The rodent motivation mechanism may comprise a moving belt disposed between front and rear belt rollers attached to respective front and rear lower surfaces of the elongated tube, at least one of the front and rear belt rollers being rotated via a motor electrically coupled to the power conversion and control circuit.

The elongated housing contains therein the elongated tube and has attached to an outside surface an elongated housing containing therein power conversion and control circuit and a battery. The elongated tube may comprise an inner elongated tube, and the elongated housing comprises an outer elongated tube, the outer elongated tube having a diameter greater than that of the inner elongated tube.

The electrical conductor(s) may comprise one or more wires passing through an inner portion of the elongated tube, one or more electrodes disposed within a slot formed within an inner surface of the elongated tube and axially extending along a portion of the elongated tube, or other means of contacting a rodent with an energized conductor.

The electrical conductor may comprise a plurality of electrodes disposed within corresponding slots formed within the inner surface of the elongated tube and axially extending along respective portions of the elongated tube.

The electrical conductor may comprise a plurality of electrodes disposed within corresponding slots formed within the inner surface of the elongated tube and axially extending along respective portions of the elongated tube.

The rodent killing apparatus may further comprise a front stand secured to a lower front portion of the elongated housing and a rear stand secured to a lower rear portion of the elongated housing, the front stand having a height greater than a height of the rear stand; and a cleaning port having a wider portion passing through an aperture at an upper front portion of the elongated housing, and a narrow portion passing through an aperture at an upper front portion of the elongated tube. The cleaning port may comprise a funnel structure or may be configured to receive a detachable funnel structure such as for the insertion of cleaning solution, water, and the like into the apparatus.

The elongated housing may comprise an opaque material and the elongated tube comprises a translucent material, the apparatus may further comprise an observation aperture formed within an upper portion of the elongated housing, the observation aperture having fitted thereto a removable observation door.

The apparatus and its components may be adapted in size for any rodent, such as rats or mice.

FIG. 1 depicts a perspective diagram of a rodent killing apparatus according to several embodiments. Specifically, FIG. 1 depicts a rodent control (killing) device 100 comprising an elongated outer enclosure 110 having a front portion and a rear portion and having axially disposed or inserted therein an elongated inner enclosure 120. As depicted in FIG. 1, each of the elongated outer enclosure 110 and elongated inner enclosure 120 comprises cylindrical enclosures or tubes, wherein the diameter of the elongated outer enclosure 110 is greater than the diameter of the elongated inner enclosure 120. As depicted in FIG. 1, the length of the elongated outer enclosure 110 is greater than the length of the elongated inner enclosure 120, though in some embodiments the length of the elongated inner enclosure 120 may be equal to or greater than the length of the elongated outer enclosure 110.

As depicted in FIG. 1, the front end of the elongated outer enclosure 110 is open so that rodents may enter, lured into the elongated outer enclosure 110 by bait such as cheese or peanut butter or other food known to attract rodents of the type to be controlled.

As depicted in FIG. 1, a protective housing or canopy 130 is disposed upon an outer surface of the elongated outer enclosure 110 and includes therein various electronic circuitry associated with the various embodiments, such as one or more batteries 132, various power conversion and control circuitry/components 134, and three step-up transformers 135-1 through 135-3 (more or fewer step-up transformers 135 may be used). Generally speaking, the various electronic circuitry is configured to create one or more electrical signals of a type lethal to rodents to be controlled, to generate power for a rodent motivation mechanism, and to do so in response to a trigger signal T indicative of a rodent entering the elongated inner enclosure 120.

As depicted in FIG. 1, the elongated inner enclosure 120 has a diameter sized to be large enough (but not much larger) than necessary to allow entry by rodents of the type to be controlled. Further, the front end of the elongated inner enclosure 120 is normally closed off by a door 121 which may be attached to the elongated inner enclosure 120 via a springe hinge 121H or other means. Further bait may be provided within the elongated inner enclosure 120 to attract rodents to urge the door 121 open and enter the elongated inner enclosure 120. The door 121 may have various apertures or holes formed therethrough to allow the smell of bait inside the elongated inner enclosure 120 to pass through to a rodent proximate the door 121.

The door 121 is configured to be easy for rodents to push open, and when a rodent pushes open the door 121 and enters the elongated inner enclosure 120, a trigger switch 121T is activated and a trigger signal T is sent to electronic components such as power conversion and control components 134 disposed within the protective housing 130. In response to receiving the trigger signal T, the power conversion and control components 134 energize various conductors disposed within a killing region or portion of the elongated inner enclosure 120.

In some embodiments, a rodent motivation mechanism is provided to move or urge the movement of a rodent or the remains of a rodent through the elongated inner enclosure 120 toward a rodent disposal bag 145 connected to the apparatus 100 via a bag attachment assembly 140. As depicted in FIG. 1, the rodent motivation mechanism comprises a conveyor belt assembly 138 comprising a front roller 138-FR and rear roller 138-RR having a conveyor belt 138-B coupled thereto. The front roller 138-FR is secured to a lower front inner surface of the elongated inner enclosure 120, and the rear roller 138-RR is secured to a lower rear inner surface of the elongated inner enclosure 120. As depicted, the front roller 138-FR is urged to rotate by a motor 138-M powered by a motor control signal M from the battery 132 or from the power conversion and control circuitry 134. In these embodiments, as a result of the door 121 being opened and the tripping of the trigger switch 121T (or other trigger source TS), a motor 138-M (e.g., a battery-powered shunt wound DC motor) begins turning one or both of the front roller 138-FR and rear roller 138-RR such that the conveyor belt 138-B moves the rodent toward the back end of the elongated inner enclosure 120.

As depicted in FIG. 1, the conveyor belt 138-B travels in a closed loop as it is powered by the battery-driven motor while it is forced by rollers, at both the front end of the tube and the back end of the tube, to move from the front end where the door is to the back end while carrying one or more rodents with it.

As a rodent moves down the elongated inner enclosure 120 on the conveyor belt 138-B, it comes into contact with live or energized conductors 136 such as wires/electrodes that protrude from the top of the tube and, which touched by the rodent, electrocute the rodent with a lethal amount of current.

Figure 2:
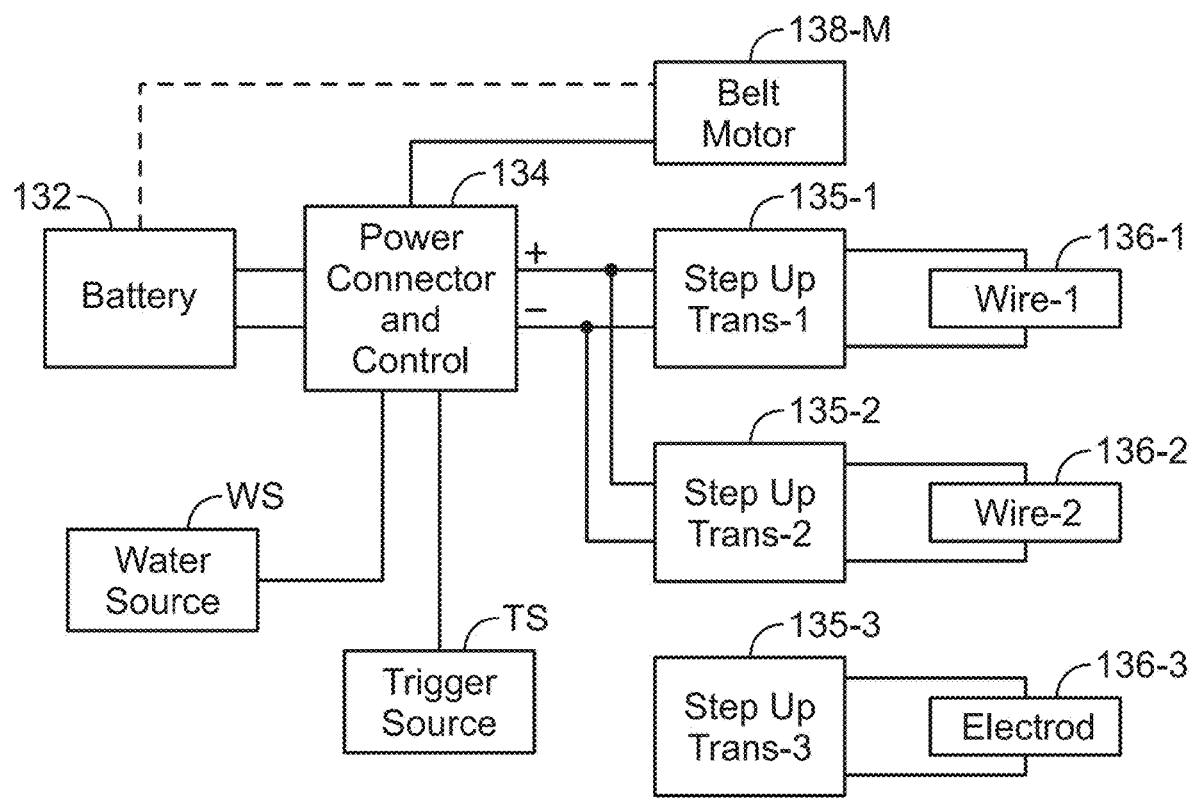
FIG. 2 depicts a high level block diagram of circuit elements according to several embodiments.

FIG. 2 depicts a high level block diagram of circuit elements according to several embodiments. Specifically, FIG. 2 depicts one or more batteries 132 operably coupled to power conversion and control circuitry 134, and to a conveyor belt motor 138-M.

That is, in some embodiment where conveyor belt motor 138-M is used, the energy to power the conveyor motor 138-M is provided directly from a battery (either a main battery or a secondary battery, perhaps having a different voltage level than the main battery) or provided indirectly via power conditioning circuitry and the like within the power conversion and control circuitry 134.

The power conditioning within the power conversion and control circuitry 134 may comprise various rectifier/bridge circuitry, control circuitry, switching circuitry, logic circuitry (combinational, sequential, and/or microprocessor controlled), and so on as will be appreciated by those skilled in the art.

In various embodiments, the power conversion and control circuitry 134 is configured to convert low voltage direct current (DC) power from battery 132 into a low voltage alternating current (AC) signal at a pair of output terminals, which terminals are coupled to input terminals (windings) of one or more step-up transformers 135 for conversion thereby into respective one or more high voltage AC signals at corresponding step-up transformer output terminals (windings). The one or more high voltage AC signals (illustratively three) are used to energize respective conductors 136, illustratively first wire 136-1, second wire 136-2, and electrode 136-3. These conductors (wires, electrodes, and the like) when energized are able to deliver sufficient energy to a rodent in contact with the conductor such that the rodent is killed.

In some embodiments, a first battery is used to power the conveyer belt motor 138-M while a second battery provides current for the field windings of a shunt wound DC motor and for the rotor of the motor, and this motor then turns an alternator which sends alternating current through a step-up transformer which then sends current through the wires that electrocute the rats as they travel through the tube on the conveyor belt 138-B. This second battery also provides current for the windings of the alternator's rotor.

In various embodiments, multiple conductors are spaced at intervals throughout the elongated inner enclosure 120 such that if a rodent is not electrocuted as a result of its initial contact with the first set of conductors, there are one or more additional sets of conductors that will administer further electrical shocks to the rodent such that the rodent should be killed and is carried to the disposal bag via the conveyor belt 138-B.

The back end of the elongated inner enclosure 120 is depicted as having a door that remains closed while one or more rodents are traveling on the conveyor belt 138-B through the elongated inner enclosure 120.

In operation, in one embodiment when a rodent such as a rat pushes its way through the door 121 at the front of the elongated inner enclosure 120, a lever on the door actuates a switch 121-T that allows current from both batteries 132, the battery that powers the motor 138-M that drives the conveyor belt 138-B and the battery 132 that powers the AC signal source (e.g., a motor connected to an alternator, a chopping circuit feeding a half-wave or full-wave bridge rectifier, etc.) such that low voltage AC signals are provided to the step-up transformers 135 for conversion to high voltage AC signals for use by the conductors within the elongated inner enclosure 120.

Once a rodent has pushed its way through the door 121 to the tube and its body no longer touches the door, the door 121 falls back to its closed position both through gravity and/or spring action of hinge 121-H.

In various embodiments, the trigger signal T causes a counter circuit to be initiated (e.g., microprocessor controlled, sequential logic such as JK or D type flip flops, and the like) which begins counting up to a pre-determined number, the number being large enough to provide sufficient delay time for a rodent to reach the end of the elongated inner enclosure 120 while being transported on the conveyor belt 138-B. This is to make sure that the rodent is electrocuted. When the counter reaches the pre-determined maximum number of its count, it resets to its zero state, also deactivating the delivery of power to the conveyer belt motor 138-M, AC signal source, and so on, thus shutting down operation of the apparatus or device.

In some embodiments, in the event that another rodent pushes its way through the door before the counter reaches its maximum count (i.e., before the delay time has expired), an activation rod 121-AR attached to the inside of the door pushes the switch 121-S on the inside top of the elongated inner enclosure 120, which resets the counter to its zero state. In this manner, each time a new rodent enters the elongated inner enclosure 120, the digital up counter starts its count over again, thus insuring that there shall be sufficient time to electrocute each rodent that enters the elongated inner enclosure 120 before the counter reaches its maximum count and then resets itself back to zero, which in some embodiments then deactivates the solenoid that holds the switch 121-S for the battery circuits 132 in the closed position. This avoids deactivating circuits before every rodent that pushes through the door 121 has been electrocuted.

As previously described, the elongated outer enclosure 110 or tube in which the elongated inner enclosure 120 or tube is contained has disposed thereon a protective housing or canopy to house the various electronic components described herein, such as battery packs, DC motors, alternator, power conversion and control circuitry, step-up transformer or transformers, microprocessor with digital up counter (or equivalent logic circuitry), placed and secured on the top of its outside where they can be easily accessed for purposes of battery changes when necessary. This "canopy" or housing 130 may be attached to the elongated outer enclosure 110 by hinges so that it can be opened to allow access to the electronics when the batteries need to be changed or for other reasons in regard to the electronic components.

The upper part of the elongated outer enclosure 110 is attached to the lower part of the elongated outer enclosure 110 by hinges so as to allow the upper part of the elongated outer enclosure 110 to open up, thus allowing the upper part of the elongated inner enclosure 120 to be viewed, and the upper part of the elongated inner enclosure 120 may be made of a transparent material such as plexiglass so that when the elongated outer enclosure 110 is opened via its hinges, the inside of the elongated inner enclosure 120 can be clearly seen, thus allowing the rodents inside of the elongated inner enclosure 120 to be viewed.

Once all the rodents have been electrocuted, the embodiments may provide for an easy, sanitary, and user-friendly method of disposing of the dead rats without having to see them by flushing a cleaning solution, water, or other liquid through at least the elongated inner enclosure 120 from front to back so as to wash the interior of the elongated inner enclosure 120 by moving debris and rodent bodies toward the rear disposal bag 145.

Referring to FIG. 2, a cleaning port 160 is depicted as comprising a detachable or integrated funnel structure that extending through the elongated outer enclosure 110 via a first funnel aperture FA1 and through the elongated inner enclosure 120 via a second funnel aperture FA2, where the diameter of FA1 is greater than or equal to the diameter of FA2. The cleaning port may comprise a funnel structure integrated into the embodiments, or may simply be the two apertures FA1, FA2 configured to receive a detachable funnel structure such as for the insertion of the cleaning solution, water, and other liquid into the apparatus. As depicted, the "funnel" 160 near the front of the elongated inner enclosure 120 (inner tube) can be accessed from the elongated outer enclosure 110 (outer tube) by manually pulling part the funnel 160 outwards so that it protrudes from the top of the elongated outer enclosure 110 (outer tube). That is, the funnel 160 may be "telescoped" outward into an operational position and pushed back into the elongated outer enclosure 110 (outer tube) for storage in a retracted position. In various embodiments, the funnel 160 operationally connects the outer surface of the elongated outer enclosure 110 to the inner surface of the elongated inner enclosure 120 to avoid inserting cleaning solution to any spaces therebetween.

Figure 3:
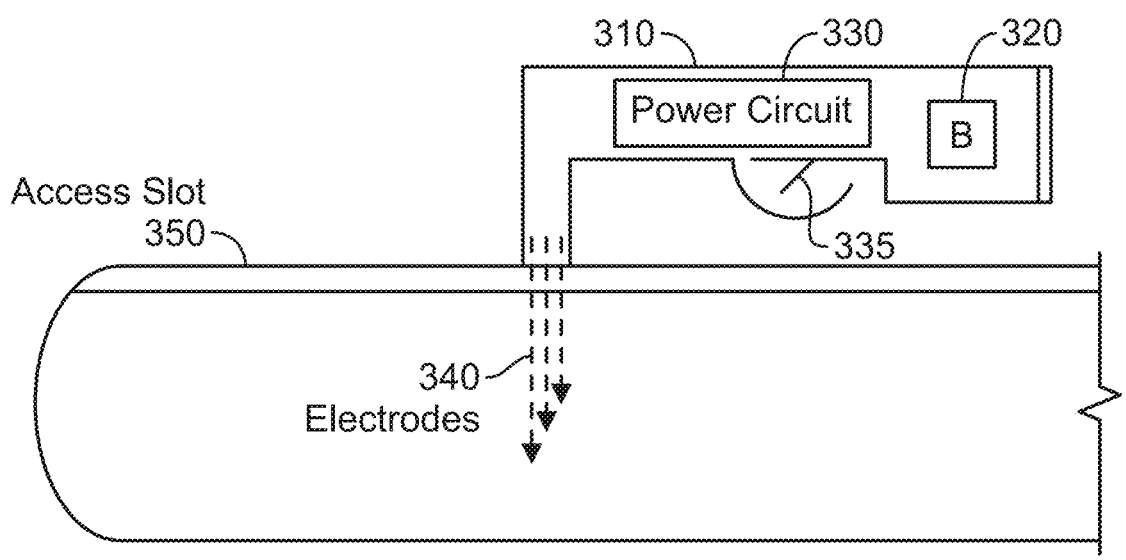
FIG. 3 depicts a perspective diagram of a secondary electrocution means suitable for use with the rodent killing apparatus of FIG. 1.

FIG. 3 depicts a perspective diagram of a secondary electrocution means suitable for use with the rodent killing apparatus of FIG. 1. Specifically, in the event of one or more rodents still being alive after electrocution, some embodiments provide a means of secondary electrocution; namely, a secondary device 310 having, illustratively, a shape of a handgun that lays flat against the transparent top of the inner tube. When the elongated outer enclosure 110 viewing port is opened via its hinges, and it is seen that one or more of the rodents in the inner tube is still alive, then this "gun" can be used to kill them. The gun 310 may contain therein a battery pack 320 holding batteries that provide current to power circuitry 330 configured to generate lethal voltage levels which are delivered to conductors 340, which conductors may be manually inserted into the elongated inner enclosure 120 to kill any remaining live rodents.

The power circuitry 330 may be implemented in a manner similar to that of the power conversion and control circuitry 134 described above, such as wave shaping circuitry coupled to step-up transformers, or field windings of a shunt wound DC motor having a rotor that drives an alternator. The batteries 320 (or an external battery pack 320-EXT (not shown) are sized to provide sufficient current to energize the electrodes 340 (e.g., magnetize the field windings of the alternator, etc.). If an alternator is used, then the alternator sends current through the primary of a step-up transformer and when the "gun" is lifted up via hinges to a vertical position, two electrodes (more or fewer may be used) can be extended through a narrow slot 350 extending along the transparent top of the elongated inner enclosure 110 (inner tube) and placed against a rodent's body while current sufficient to kill the rat flows through the secondary of the step-up transformer into the electrodes and then into the rodent, thus killing it.

The "gun" 310 is activated by pressing a trigger 335 while the electrodes are extended through the slot in the transparent top of the inner tube and pressed against the rodent's body.

The "gun's" electrodes 340 can be slid along the entire length of the inner tube since the slot extends along almost all of the inner tube's length. In this manner, any rodent that was not killed initially can then be killed by sliding the "gun's" electrodes 340 along the slot until they come into contact with the rodent.

The various embodiments may be deployed effectively in numerous environments/locations, such as parks, alleys, basements or crawl spaces therein, outdoor areas near a buildings where there are lots of rats and so on. The embodiments may be anchored to the ground with bolts or otherwise secured by means of some other fastening method; and in case of devices that need to be moved to another location, the fastening method should be such that it is fairly easy to remove so that the device can then be transported to a location where it is needed and anchored there. If used inside of a building, it can be anchored to a wall or a floor in similar fashion.

The outer tube shall be placed on two stands only slightly higher than ground level, one at its front end and one at its back end, and the tubes can be lifted up from the front end so that they can rotate through an angle around the stand at the tube's back end.

In order to dispose of the dead rats, the tubes can be lifted up and rotated around the stand at the back end while water is poured into the funnel that has been telescoped out so that it protrudes from the outer tube, and the water rushing through the inner tube shall wash the rats through the inner tube and into a disposal bag that fits snugly to the tube's back end.

The tube's back end has a door that is normally closed; however, this door can be lifted so as to allow the rats to be washed into the disposal bag. In this way, the rats can be washed into the disposal bag in a sanitary and user-friendly fashion, and the bag can then be removed and the rats taken away for sanitary disposal. he exact lengths of the outer and inner tubes should be such that a large number of rats can be contained in the inner tube without making the outer and inner tubes so long as to be unwieldy and too difficult to move from one location to another, if necessary.

The inner tube shall be placed far enough from the open front end of the outer tube, so as to ensure that no one shall be able to access the inner tube from the front of the outer tube, and this shall be for reasons of safety.

The optimal number of hot wires to be placed in the inner tube for purposes of killing the rodents may be varied depending upon power available, circuitry used for generation of lethal voltage, type of rodent to be killed, and so on. There should be enough wires/conductor to insure that every rodent entering the inner tube killed as a result of coming into contact with an energized hot wire.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. Apparatus for killing rodents, comprising:
   an elongated tube having a front end aperture sized to receive a rodent and a rear end configured to attachably receive a rodent disposal bag;
   a power conversion and control circuit for generating at least one alternating current (AC) electrical signal in response to a trigger signal indicative of the presence of a rodent within the elongated tube;
   at least one step-up transformer for converting an AC electrical signal into a high voltage AC electrical signal;
   at least one conductor for exposing a high voltage AC electrical signal to a rodent within the elongated tube; and
   a rodent motivation mechanism configured to move a rodent toward the distal end of the elongated tube;
   wherein the rodent motivation mechanism comprises a moving belt disposed between front and rear belt rollers attached to respective front and rear lower surfaces of the elongated tube, at least one of the front and rear belt rollers being rotated via a motor electrically coupled to the power conversion and control circuit.

2. The apparatus of claim 1, further comprising:
   an elongated housing containing therein the elongated tube; and
   an enclosure, attached to the elongated housing, containing therein the power conversion and control circuit and a battery.

3. The apparatus of claim 2, wherein the elongated tube comprises an inner elongated tube, and the elongated housing comprises an outer elongated tube, the outer elongated tube having a diameter greater than that of the inner elongated tube.

4. The apparatus of claim 2, further comprising:
   a front stand secured to a lower front portion of the elongated housing and a rear stand secured to a lower rear portion of the elongated housing, the front stand having a height greater than a height of the rear stand; and
   a cleaning port passing through an aperture at an upper front portion of the elongated housing, and an aperture at an upper front portion of the elongated tube.

5. The apparatus of claim 2, further comprising:
an observation aperture formed within an upper portion of the elongated housing, the observation aperture having fitted thereto a removable observation door.

6. The apparatus of claim 1, wherein the electrical conductor comprises one or more wires passing through an inner portion of the elongated tube.

7. The apparatus of claim 6, wherein the electrical conductor comprises a plurality of electrodes disposed within corresponding slots formed within the inner surface of the elongated tube and axially extending along respective portions of the elongated tube.

8. The apparatus of claim 1, wherein the electrical conductor comprises one or more electrodes disposed within a slot formed within an inner surface of the elongated tube and axially extending along a portion of the elongated tube.

9. The apparatus of claim 8, wherein the electrical conductor comprises a plurality of electrodes disposed within corresponding slots formed within the inner surface of the elongated tube and axially extending along respective portions of the elongated tube.

10. The apparatus of claim 1, wherein the front end aperture is sized to receive a rat.

11. The apparatus of claim 1, wherein the front end aperture is sized to receive a mouse.

12. The apparatus of claim 1, further comprising a secondary electrocution means comprising conductors configured for manual insertion through an aperture formed within the elongated tube to deliver thereby a high voltage AC electrical signal to a rodent therein.

13. The apparatus of claim 12, further comprising:
a front stand secured to a lower front portion of the elongated housing and a rear stand secured to a lower rear portion of the elongated housing, the front stand having a height greater than a height of the rear stand; and
a cleaning port passing through an aperture at an upper front portion of the elongated housing, and an aperture at an upper front portion of the elongated tube.

14. The apparatus of claim 1, wherein the front end aperture is sized to receive at least one of a rat and a mouse.

15. Apparatus for killing rodents, comprising:
an elongated tube having a front end aperture sized to receive a rodent and a rear end configured to attachably receive a rodent disposal bag;
a power conversion and control circuit for generating at least one alternating current (AC) electrical signal in response to a trigger signal indicative of the presence of a rodent within the elongated tube;
at least one step-up transformer for converting an AC electrical signal into a high voltage AC electrical signal;
at least one conductor for exposing a high voltage AC electrical signal to a rodent within the elongated tube;
a rodent motivation mechanism configured to move a rodent toward the distal end of the elongated tube;
an elongated housing containing therein the elongated tube;
an enclosure, attached to the elongated housing, containing therein the power conversion and control circuit and a battery; and
an observation aperture formed within an upper portion of the elongated housing, the observation aperture having fitted thereto a removable observation door.

16. The apparatus of claim 15, wherein the elongated tube comprises an inner elongated tube, and the elongated housing comprises an outer elongated tube, the outer elongated tube having a diameter greater than that of the inner elongated tube.

17. The apparatus of claim 15, wherein the electrical conductor comprises one or more wires passing through an inner portion of the elongated tube.

18. The apparatus of claim 15, wherein the electrical conductor comprises one or more electrodes disposed within a slot formed within an inner surface of the elongated tube and axially extending along a portion of the elongated tube.

19. The apparatus of claim 18, wherein the electrical conductor comprises a plurality of electrodes disposed within corresponding slots formed within the inner surface of the elongated tube and axially extending along respective portions of the elongated tube.

20. The apparatus of claim 15, further comprising a secondary electrocution means comprising conductors configured for manual insertion through an aperture formed within the elongated tube to deliver thereby a high voltage AC electrical signal to a rodent therein.

* * * * *